United States Patent

[11] 3,557,878

| [72] | Inventor | Carl F. Schuman<br>Utica, Mich. |
|---|---|---|
| [21] | Appl. No. | 697,229 |
| [22] | Filed | Jan. 11, 1968 |
| [45] | Patented | Jan. 26, 1971 |
| [73] | Assignee | Ryan Equipment Company<br>St. Paul, Minn.<br>a corporation of Minnesota |

[54] ROLL-FORMING DEVICE FOR SOD STRIPS
20 Claims, 9 Drawing Figs.

[52] U.S. Cl. ................................................. 172/20
[51] Int. Cl. ............................................ A01b 45/04
[50] Field of Search ............................................ 172/19, 20, 21, 233; 293/49, 60

[56] References Cited
UNITED STATES PATENTS

| 2,401,653 | 6/1946 | Mohler .................... | 172/20 |
| 2,987,124 | 6/1961 | Hadfield ................... | 172/20 |
| 3,164,211 | 1/1965 | Scott ........................ | 172/19 |
| 3,387,666 | 6/1968 | Hadfield ................... | 172/20 |
| 2,682,824 | 7/1954 | Bowser et al. ............. | 172/19 |

*Primary Examiner*—Robert E. Bagwill
*Assistant Examiner*—Stephen C. Pellegrino
*Attorney*—Stryker and Jacobson ABSTRACT: A self-propelled tractor having a blade periodically reciprocable at predetermined intervals to transversely sever sod strips, and to frictionally engage and draw upwardly a severed end of such sod strip as the blade withdraws, attached by a connector assembly to pull a wheeled frame; a first sod roll-forming rack suspended from said connector assembly to engage the uplifted end of sod initiating a first stage of sod roll formation, and a second rack suspended beneath said wheeled frame rearwardly of said first rack to engage a partially formed roll of sod in succession to said first rack to initiate and carry to completion a final stage of sod roll formation, said second rack having a rearward extension adjustable for final engagement with a nearly completed roll of sod to ensure that each completed sod roll will have the loose end of the strip at the top; said tractor has adjustably mounted at its forward end an assembly of vertically disposed rollers to encounter and displace from the path of the advancing construction, sod rolls formed from an adjoining strip of sod by prior travel of the construction.

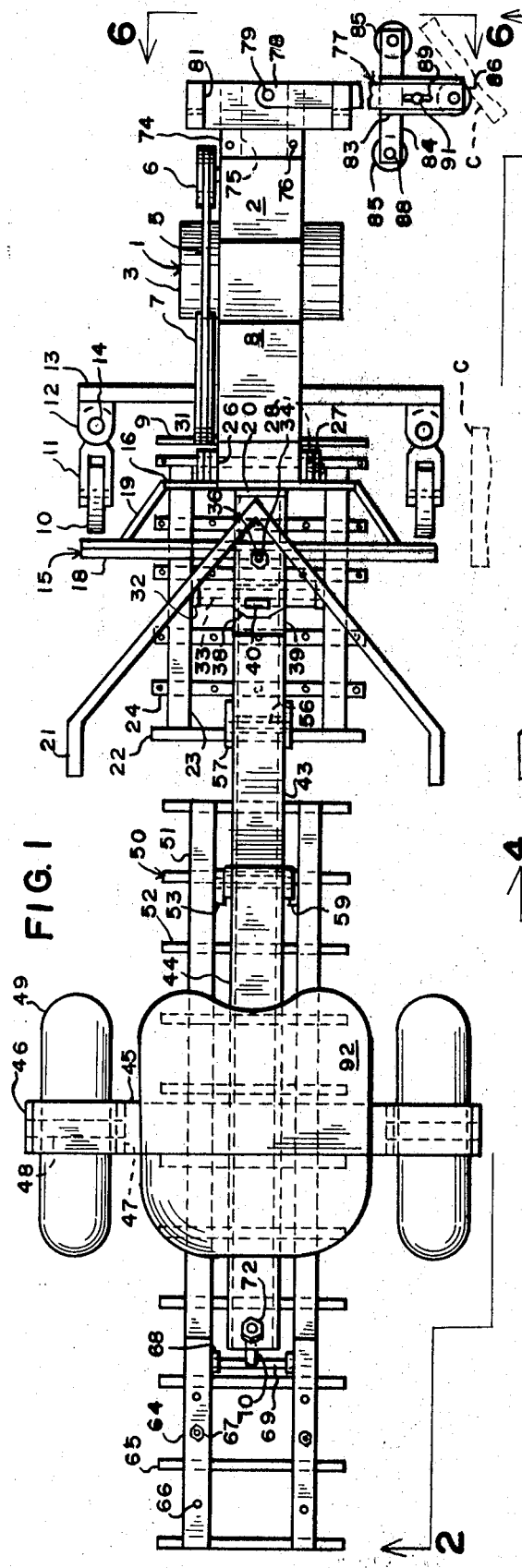

PATENTED JAN 26 1971 3,557,878
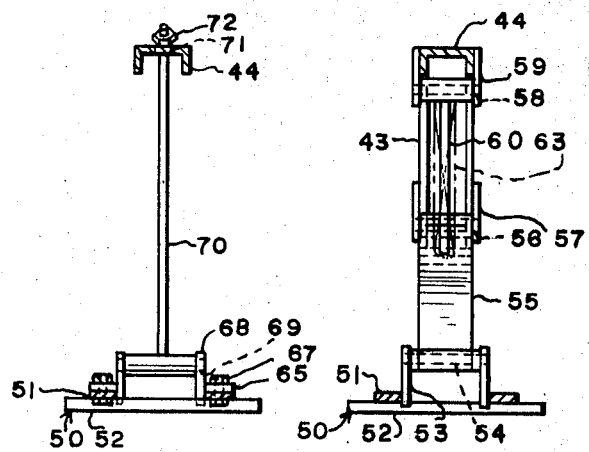
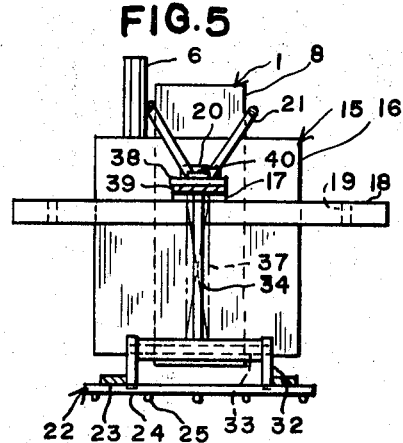
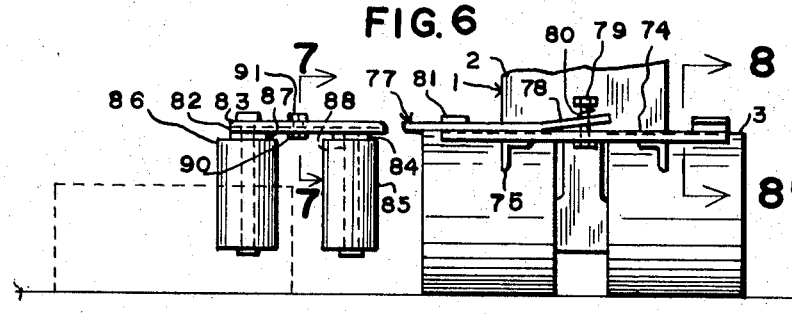
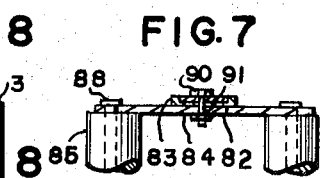
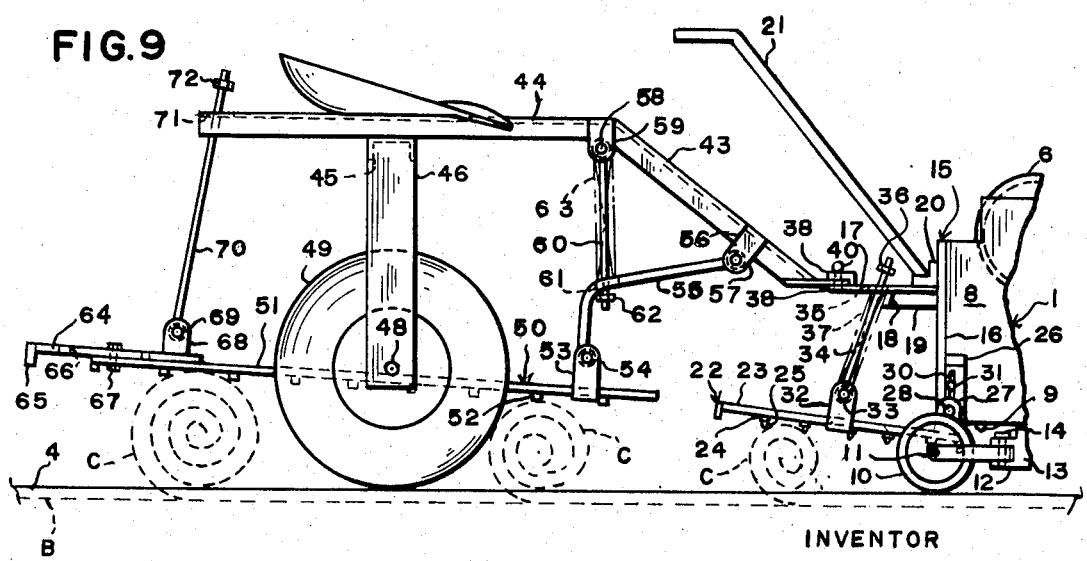
INVENTOR
CARL F. SCHUMAN
BY Allan J. Murray
ATTORNEY

3,557,878

ROLL-FORMING DEVICE FOR SOD STRIPS

This invention relates to devices for forming sod strips into rolls and particularly to such devices as may be employed with a self-propelled tractor having a blade substantially vertically, reciprocably actuable to sever sod strips into desired lengths and to frictionally engage and draw upwardly and in the direction of travel the end of a sod strip so severed, so that roll-forming devices may then successively engage said sod and carry the strip through successive roll-forming stages.

In prior practice, sod-rolling machines have employed powered belts and rotating cylinders fitted with radially projecting ribs, and the like, to impel the sod strips into rolled form. These devices required heavy frames and mounting elements, and means to raise the cylinders to pass over a completed sod roll, as well as drive means. The results have been highly unsatisfactory; i.e., incomplete rolls and mutilated sod, manual removal of sod rolls from the path of the machine, etc.

An object of the invention is to construct a towable sod-rolling device of mechanical simplicity and light weight.

Still another object is to device devise such a sod roller in in a manner to afford use of a seat so that an operator may ride on the construction in a position giving access to the tractor controls.

A further object is to dispose an assembly of rollers forwardly on the tractor, and to provide means to adjust the position of the rollers to encounter and gently displace from the path of the construction sod rolls on an immediately adjoining strip formed by prior passage of the construction.

A further object of the invention is to employ in combination a self-propelled tractor having a blade reciprocably actuable at predetermined intervals to transversely sever previously loosened strips of sod and to frictionally engage and lift the end of a strip so severed as the tractor moves forward, and to provide rearwardly of said tractor successive sod-rolling devices to engage and said strip of sod as it is raised and carry it through successive roll-forming stages.

These and various other objects are attained by the construction hereinafter described, and illustrated in the accompanying drawings, wherein:

FIG. 1 represents a plan view of the combined tractor and trailer.

FIG. 2 represents a side elevational view on line 2-2 of FIG. 1.

FIG. 3 is a vertical, partial, sectional view of a rack suspension means assembly on line 314 3-3 of FIG. 2.

FIG. 4 is a vertical, partial, sectional view of another rack suspension means assembly on line 4-4 of FIG. 2.

FIG. 5 is a vertical, partial, sectional view of still a third rack suspension means assembly on line 5-5 of FIG. 2.

FIG. 6 is a partial, vertical, sectional view on line 6-6 of FIG. 1 showing the roller assembly on a larger scale.

FIG. 7 is a partial, vertical, sectional view on line 7-7 of FIG. 6 further illustrating the construction of the roller assembly.

FIG. 8 is a partial, vertical, sectional view on line 8-8 of FIG. 4 illustrating one of two identical latch members to secure the roller assembly in a desired position to displace an sod rolls.

FIG. 9 illustrates a partial, sectional view similar to FIG. 2 and illustrating the approximate position of the sod roll-forming devices in intermediate stages of forming the sod rolls.

In these views the reference character 1 designates a tractor available in commercial form and portrayed, for convenience, in a simple manner. Said tractor includes a main supporting frame and is powered by an engine 2 which through a drive (not shown) effects rotation of drive wheels 3 upon the surface 4 of a field of sod. Prior to the travel of said tractor over said sod, strips of sod A of a desired width and depth have been severed by any convenient device, the vertical depth of such severing being indicated at B.

By means of a belt 5, a drive is transmitted from a drive pulley 6 to a driven pulley 7. The effect of such drive is controlled by a clutch (not shown), but subject of U.S. Pat. No. 3,061,059, provided in a clutch housing 8 by the manufacturer. Said clutch is engaged at predetermined intervals responsive to a metering wheel mechanism (not shown) to effect a substantially vertical, reciprocable travel of a sod-severing blade 9 to cut the strips of sod into desired lengths. Supporting wheels 10 are journaled in wheel-mounting members 11 each of which has its forward end portion pivotally received in a clevis 12 at the outer end of an outrigger 13, and pivotally retained in said clevis by pins 14.

A connector assembly 15, includes a mounting plate 16 which is secured to the rear face of the clutch housing by any conventional means such as machine screws (not shown) received in holes drilled and tapped in the clutch housing. At its upper end portion the mounting plate carries a hitch plate 17, which is partially supported by a laterally elongated footrest 18 mounted on supports 19. The hitch plate 17, mounting plate 16, footrest 18, and supports 19, may be all be secured in assembly as by welding or the like. Surmounting said hitch plate 17 and abutting the mounting plate 16 is an angle bracket 20 which mounts the lower ends of tractor handles 21. Conventionally, said tractor handles may be somewhat more complex than illustrated, and may carry controls to operate the tractor 1.

As the severing blade 9 retracts upwardly after completing a cutting operation, the forward motion of the machine combined with the substantially vertical retraction of the blade causes the blade to frictionally engage and lift the end of a freshly severed sod strip A (FIG. 2) so that as the upward travel of the blade releases the sod, said sod is engaged by means for rolling up the sod. In the disclosed construction such means includes a first rack 22 which continues the rollup of the sod and additional means still to be described for completing the rollup of the sod. Said first rack is formed with longitudinal members 23 extending in the direction of a path of travel of the construction. Lateral members 24 are spaced at intervals along and beneath said longitudinal members, and are provided with downwardly depending fingers 25 to afford a more certain engagement with the sod.

Attached to the mounting plate 16 are spaced-apart ears 26 straddling the clutch housing. Pivot lugs 27 are welded or otherwise secured at the forward end portion of the first rack to abut the respective ears 26. Pivots 28 are received in said pivot lugs and are themselves carried by a pivot plate 29. Said pivot plates are slotted as at 30 for vertical adjustment relative to said ears 26 and may be secured in any desired position of said adjustment by means of machine screws or the like 31 passing through the slot 30 to be threadedly received in the ears 26.

Rearwardly of the pivot lugs 27 is a second pair of laterally spaced pivot lugs 32, disposed at the central portion of the longitudinal members 23 of said first rack to receive a pivot 33. Mounted upon said pivot is an upwardly extending rod 34 which has rotative travel about the axis of the pivot. Said rod passes through a hole 35 in the hitch plate 17. A nut 36 threadedly received on the upper end portion of the rod resists withdrawal of said rod through said hitch plate. The described construction allows the rearward end of the first rack a reciprocable up and down travel about the axis of the pivot 28 responsive to the absence of, or the presence and increasing diameter of a sod roll passing beneath the rack. It is to be noted that a coil spring 37 reacts between the pivot 33 and the lower surface of the hitch plate 17 to urge said rack to the lower limit of said travel, thus contributing toward a firm engagement of the fingers 25 of said first rack 22 with a sod roll C being formed by said rack.

The hitch plate 17 rearwardly terminates in a clevis 38 which receives a tongue 39 and retains it by means of a T-pin 40 the vertical portion of which passes downwardly through the tongue 39 and the clevis 38 (note: reference characters 41 and 42 are not used). Said tongue is secured to the front end of the forward portion 43 of a frame, which frame also has a rearward portion 44 secured in any convenient manner to surmount a lateral frame member 45. At its outer end portion said lateral member 45 carries vertically depending outer wheel supports 46 and inner wheel supports 47. Extending between the lower portions of said pairs of wheel supports, axles 48 journal the wheels 49.

The previously mentioned means for completing the rollup of the sod comprises a second rack 50 which is suspended beneath said frame and between said wheels and includes longitudinal members 51 bearing dependent lateral members 52 spaced apart along its length. At its forward end portion said second rack carries a pair of upstanding spaced lugs 53 apertured to rotatively receive a pivot 54 to which is mounted, for swinging travel about the axis of said pivot, the lower end portion of an arm 55. The upper end of the arm is terminally secured for travel about the axis of a pivot member 56 mounted in spaced lugs 57 secured to and depending downwardly from the forward portion 43 of the frame. Still another pivot 58 is carried by downwardly depending lugs 59 in the forward end of the rearward portion 44 of said frame, and a downwardly dependent rod 60 is secured for rotation with said pivot and has its lower end portion passing through a hole 61 in the arm 55. A nut 62 resists downward withdrawal of the arm 55 from the rod 60 and said rod is encircled by a coil spring 63 reacting between the pivot 58 and the arm 55 to urge the rack 51 downwardly.

It is desirable to provide for said second rack a rearward extension including longitudinal members 64 terminally conjoined by a laterally extending member 65. By means of a plurality of holes 66 in said members 64 and a nut and bolt 67 received in said members 51, said extension may be disposed as desired on the rearward end portion of the second rack. It is desirable to adjust said extension so that the engagement of the last-mentioned lateral member, 65, will ensure that the sod roll is completed with the loose end at the top. Said extension carries spaced upstanding lugs 68 which receive a pivot member 69. A rod 70 is secured for rotation about the axis of the pivot 69 and extends upwardly to pass through a hole 71 formed in the rearmost portion of the frame member 44. A nut 72 threaded on the upper end portion of the rod 70 resists withdrawal through said hole 71 of the rod.

The suspension system described above for the second rack affords it a reciprocable up and down travel about the axes of pivots 54 and 56 responsive to the absence of, or the presence and increasing diameter of a sod roll passing beneath said second rack.

In extended operation the machine hereinbefore described will naturally be employed to form rolls of sod in successive adjoining strips, and as it completes each trip it leaves behind it a series of sod rolls C. The sod rolls are, however, disposed in the path of the machine as it makes a next successive pass to form sod rolls of the next adjacent strip. It is obviously of first importance that the previously formed sod rolls be removed from the path of said wheels to avoid damage to the rolls and interference with the operation of the machine.

It is a part of this invention to provide a sod roll displacer assembly, which experience has shown displaces said rolls from the path of the machine without damage to the rolls. On the forward end of the tractor is a plate 73. A mounting plate 74 is secured to angle supports 75 which are received beneath the plate 73 and secured thereto as by screws 76, or the like. A roller assembly arm 77 has an end portion 78 secured as by a pivot assembly 79 to said mounting plate 74. As clearly appears in FIG. 4, said end portion of the assembly arm is at an angle inclined to the arm whereby a coil spring 80 received on the pivot assembly may exert a downward pressure thereon. At either end of the mounting plate 74 are rigidly disposed latch members 81. Thus, the arm 77 may be pivotally swung to project from either side of the machine, or may be permitted to extend forwardly thereof if desired. When the arm 77 is engaged in either latch 81, the tension of spring 80 tends to retain the arm in said engagement.

A roller assembly includes a base plate 82 having flanges 83 to straddle the edges of the roller assembly support arm. A crossbar 84 is secured to and beneath said base plate to carry at either end thereof a pair of rollers 85. A third roller 86 is secured to the end portion of the base plate, and may be surmounted by a spacer 87 interposed between the upper surface of the roller, in close vertical association with the other two rollers. Pivot elements upon which said rollers may rotate are designated by the numeral 88. The roller assembly support arm is slotted as at 89 so that a nut 90 and bolt 91 may secure the roller assembly to said support arm for adjustment longitudinally thereof.

The sod roll displacer assembly may be pivotally established at either side of the machine so that the leading roller 85 will encounter each previously formed sod roll and displace it at such an angle that the roller 86 may then engage it and complete the operation of displacing said roll from its original position and leaving it outside the path of the vehicle wheels.

It is desirable to provide a seat 92 upon which an operator may ride, with feet on footrest 18, and to dispose the seat so such operator has ready access to the tractor controls.

I claim:

1. Sod-severing and rolling apparatus comprising a sod-severing tractor supported by wheels for travel over the ground and equipped with a cutter with a periodically reciprocable between a retracted position and a sod-cutting position to sever a sod strip into desired lengths and to raise an end of each such severed strip of sod while withdrawing to said retracted position, and a sod rolling-device including a frame, ground wheels supporting said frame in an elevated position above the ground, a seat mounted on said frame above said wheels, a connector assembly securing said frame to said tractor for travel with said tractor, a first sod-rolling rack disposed rearwardly of said cutter to engage said raised sod end to partially form a roll of sod as said device travels along the ground, a first suspension means suspending said first rack from said connector assembly and affording reciprocable up and down travel of said first rack responsive to the absence of, or the presence and the increasing diameter of, a partially formed sod roll beneath said first rack, a second sod-rolling rack disposed beneath said frame rearwardly of said first rack to engage the partially formed roll of sod and to complete rolling of the sod as said device travels along the ground, and a second suspension means carried by said frame for suspending said second rack beneath said seat and affording reciprocable up and down travel of said second rack responsive to the absence of, or the presence and increasing diameter, of a roll of sod beneath said second rack.

2. Apparatus in accordance with claim 1, wherein said first rack includes one or more longitudinal members elongated in the direction of tractor travel, one or more crossmembers secured to and transversely of said longitudinal members, and a plurality of spaced-apart sod-engaging fingers protruding from said crossmembers to engage and rollup the sod.

3. Apparatus in accordance with claim 2, and further including means yieldably urging said first rack downwardly for pressing said fingers into engagement with the sod.

4. Apparatus in accordance with claim 1, wherein said second rack includes one or more longitudinal members elongated in the direction of tractor travel, one or more crossmembers secured to and transversely of said longitudinal members to engage and rollup the sod, and further including means yieldably urging said second rack downwardly to press said crossmembers into engagement with the sod roll.

5. Apparatus in accordance with claim 1, and further including an extension adjustably secured to the rear end portion of said second rack.

6. Apparatus in accordance with claim 5, wherein said first rack includes longitudinal members elongated in the direction of tractor travel, one or more crossmembers secured to and transversely of said longitudinal members, a plurality of spaced-apart sod-engaging fingers protruding from said crossmembers to engage and rollup the sod, and wherein said second rack includes one or more longitudinal members elongated in the direction of tractor travel, one or more co crossmembers secured to and transversely of said longitudinal members to engage and rollup the sod, and further including means associated with said first suspension means for yieldably urging said first rack downwardly to press said fingers into engagement with the sod, and means associated with said second suspension means for yieldably urging said second rack downwardly to press said crossmembers into engagement with the sod.

7. Sod-serving and rolling apparatus comprising a 17, tractor supported by wheels for travel over the ground and equipped with a cutter periodically reciprocable between a retracted position and a sod-cutting position to sever a sod strip into desired lengths and to raise an end of each such severed strip of sod while withdrawing to said retracted position, and a sod-rolling device including a frame, ground wheels supporting said frame in an elevated position above the ground, a connector assembly securing said frame to said tractor for travel with said tractor, a first sod-rolling rack disposed rearwardly of said cutter to engage said raised sod end to partially form a roll of sod as said device travels along the ground, said first rack including longitudinal members elongated in the direction of tractor travel, one or more crossmembers secured to and transversely of said longitudinal members, and a plurality of spaced-apart sod-engaging fingers protruding from said crossmembers to engage and rollup the sod, a first suspension means suspending said first rack from said connector assembly and affording reciprocable up and down travel of said first rack responsive to the absence of, or the presence and the increasing diameter of, a partially formed sod roll beneath said first rack, means associated with said first suspension means for yieldably urging said first rack downwardly to press said fingers into engagement with the sod, a second sod-rolling rack disposed beneath said frame rearwardly of said first rack to engage the partially formed roll of sod and to complete rolling of the sod as said device travels along the ground, said second rack including one or more longitudinal members elongated in the direction of tractor travel, and one or more crossmembers secured to and transversely of said longitudinal members to engage and rollup the sod, a second suspension means carried by said frame for suspending said second rack beneath said frame and affording reciprocable up and down travel of said second rack responsive to the absence of, or the presence and increasing diameter of, a roll of sod beneath said second rack, said second suspension means including an L-shaped arm having a first leg and a second leg longer than said first leg and having a hole therein, means terminally pivotally securing said first leg to the forward portion of said second rack, means terminally pivotally securing said second leg to the forward portion of said frame, pivot means secured to said frame rearwardly of said means pivotally securing said second leg to said frame, a rod secured to said pivot means and extending downwardly to protrude through said hole in said second leg, and means on the lower end portion of said rod for resisting withdrawal of said rod through said hole and for establishing a lower limit of said up and down travel, means associated with said second suspension means for yieldably urging said second rack downwardly to press said crossmembers into engagement with the sod and including a coil spring encircling said rod and reacting between said pivot means and said second leg, and an extension adjustably secured to the rear end portion of said second rack.

8. Apparatus in accordance with claim 7, wherein said second suspension means further includes a rearward pivot disposed at the rear end portion of said second rack, a rearward rod secured to said rearward pivot and extending upwardly therefrom and swingable in rotative travel about the axis of said pivot, a hole formed in the rear end portion of said frame and receiving said rearward rod therethrough, and means on said rearward rod for resisting withdrawal of said rearward rod downwardly through said frame hole.

9. Sod-severing and rolling apparatus comprising a sod-severing tractor supported by wheels for travel over the ground and equipped with a cutter periodically reciprocable between a retracted position and a sod-cutting position to sever a sod strip into desired lengths and to raise an end of each such severed strip of sod while withdrawing to said retracted position, and a sod-rolling device including a frame, ground wheels supporting said frame in an elevated position above the ground, a connector assembly securing said frame to said tractor for travel with said tractor, a first sod-rolling rack disposed rearwardly of said cutter to engage said raised sod end to partially form a roll of sod as said device travels along the ground, a first suspension means suspending said first rack from said connector assembly and affording reciprocable up and down travel of said first rack responsive to the absence of, or the presence and the increasing diameter of a partially formed sod roll beneath said first rack, a second sod-rolling rack disposed beneath said frame rearwardly of said first rack to engage the partially formed roll of sod and to complete rolling of the sod as said device travels along the ground, a second suspension means carried by said frame for suspending said second rack beneath said frame and affording reciprocable up and down travel of said second rack responsive to the absence of, or the presence and increasing diameter of a roll of sod beneath said second rack, a roller assembly including a mounting plate, an elongated arm having inner and outer end portion, a pivot mounting said inner end portion of d. said arm on said mounting plate for swinging travel about the axis of said pivot to position said roller assembly to engage and displace from the path of said tractor sod rolls formed by prior passage of said tractor, and a plurality of rollers mounted adjacent said outer end portion of said arm, means securing said mounting plate to said tractor, and latch means for securing said arm and associated rollers in the sod roll-displacing position.

10. Apparatus in accordance with claim 9, wherein said roller assembly includes a frame carrying one or more of said rollers, and means securing said frame to said outer end portion of said arm for adjustment thereon longitudinally of said arm to desired selective positions for sod roll displacement.

11. Apparatus in accordance with claim 10, wherein said inner end portion of said arm is inclined at a slight upward angle to the longitudinal extent of said arm, and further including spring means encircling said pivot and urging said inner inclined portion of said arm downwardly to thereby engage said arm with said latch means and hold said rollers in the sod roll-displacing position.

12. A sod-cutting and rolling mechanism comprising a sod cutter including a main frame adapted for travel over the ground, a cutoff knife mounted on said main frame for transversely severing a sod strip into lengths and initiating rollup of the sod lengths, and power means on said main frame and connected to said knife for operation thereof, an attachment frame, means pivotally connecting said attachment frame to said main frame, a pair of spaced wheels supporting said attachment frame above the ground, a seat supported by said attachment frame between said wheels, an elongated horizontally extending rack for completing rolling of the severed lengths of sod, and means supporting said sod-rolling rack on said attachment frame between said wheels and below said seat and independently of said main frame.

13. A mechanism in accordance with claim 12, wherein said means for supporting said sod-rolling rack includes means pivotally connecting said rack to said attachment frame forwardly and rearwardly of said seat.

14. In a sod-cutting and rolling mechanism including a main frame adapted for travel over the ground, a cutoff knife mounted on said main frame for transversely severing a sod strip into lengths and initiating rollup of the sod lengths, means supported by said main frame and extending rearwardly from adjacent to said knife for continuing the rollup of the sod, and power means on said main frame and connected to said knife for operation thereof, the improvement comprising an attachment frame, means pivotally connecting said attachment frame to said main frame, a pair of spaced wheels supporting said attachment frame above the ground, a seat supported by said attachment frame between said wheels, means for completing the rollup of the severed lengths of sod, and means supporting said sod rollup completing means on said attachment frame between said wheels and below said seat and extending rearwardly from adjacent to said sod rollup continuing means.

15. A sod-cutting and rolling mechanism comprising a frame, means supporting the front of said frame for travel over the ground, a cutoff knife mounted on said frame for transversely severing a sod strip into lengths and initiating rollup of the sod lengths, power means on said frame and connected to said knife for operation thereof, a pair of wheels supporting the rear of said frame above the ground and spaced transversely of the direction of travel, a seat on said frame rearwardly of said knife and between said rear wheels, a first rack supported by said frame and extending rearwardly from adjacent to said knife for continuing the rollup of the sod lengths, a second rack for completing the rollup of the sod lengths, and means supporting said second rack on said frame between said rear wheels and under said seat and with its forward end adjacent to the rearward end of said first sod-rolling rack, said second rack extending rearwardly from said first rack.

16. An attachment for a self-propelled sod-cutting cutting machine adapted for partially forming a roll of sod, said attachment comprising a frame, a pair of spaced wheels supporting said frame, means on said frame adapted for connecting said frame to a self-propelled sod-cutting machine, a seat supported by said frame between said wheels, a rack located between said wheels and below said seat for continuing the rolling up of sod rolls partially formed by said sod-cutting machine, and means pivotally connecting said rack to said frame at locations forwardly and rearwardly of said seat.

17. A sod-cutting machine comprising a frame, wheels supporting said frame, a cutter blade carried by said frame and periodically reciprocable between a retracted position and a sod-cutting position to sever a sod strip into desired lengths, power means on said frame and connected to said cutter for operation thereof, a roller assembly including an elongated arm having inner and outer end portions, and a plurality of rollers mounted adjacent said outer end portion of said arm, and means for mounting said roller assembly at the front of said frame in position to engage and displace from the path of the machine sod rolls formed by prior passage of the machine, said roller assembly mounting means including a mounting plate, means securing said mounting plate to said frame, a pivot mounting said inner end portion of said arm on said mounting plate for swinging travel about the axis of said pivot, and latch means for securing said arm and associated rollers in a sod roll-displacing position.

18. A machine in accordance with claim 17, wherein said roller assembly includes a frame member carrying one or more of said rollers, and means securing said frame member to said arm outer end portion of said arm for adjustment thereon longitudinally of said arm to desired sled selective positions for sod roll displacement.

19. A machine in accordance with claim 17, wherein said inner end portion of said arm is inclined at a slight upward angle to the longitudinal extent of said arm, and further including spring means encircling said pivot and urging said inner inclined portion of said arm downwardly to thereby engage said arm with said latch means and hold said rollers in the sod roll-displacing position.

20. In a sod-cutting machine comprising a frame, wheels supporting said frame, a cutter blade carried by said frame and periodically reciprocable between a retracted position and a sod-cutting position to sever a sod strip into desired lengths, and power means on said frame and connected to said cutter for operation thereof, the improvement comprising a roller assembly including an elongated arm having inner and outer end portions, and a plurality of rollers mounted adjacent said outer end portion of said arm, and means for mounting said roller assembly at the front of said frame in position to engage and displace from the path of the machine sod rolls formed by prior passage of the machine, said mounting means including a mounting plate, means securing said mounting plate to said frame, and a pivot mounting said inner end portion of said arm on said mounting plate for swinging travel about the axis of said pivot, and latch means for securing said arm and associated rollers in sod roll-displacing position.